Dec. 4, 1923.
W. F. MARSHALL
MOVABLE TOOL HOLDER FOR LATHES
Filed Aug. 23, 1921
1,476,262
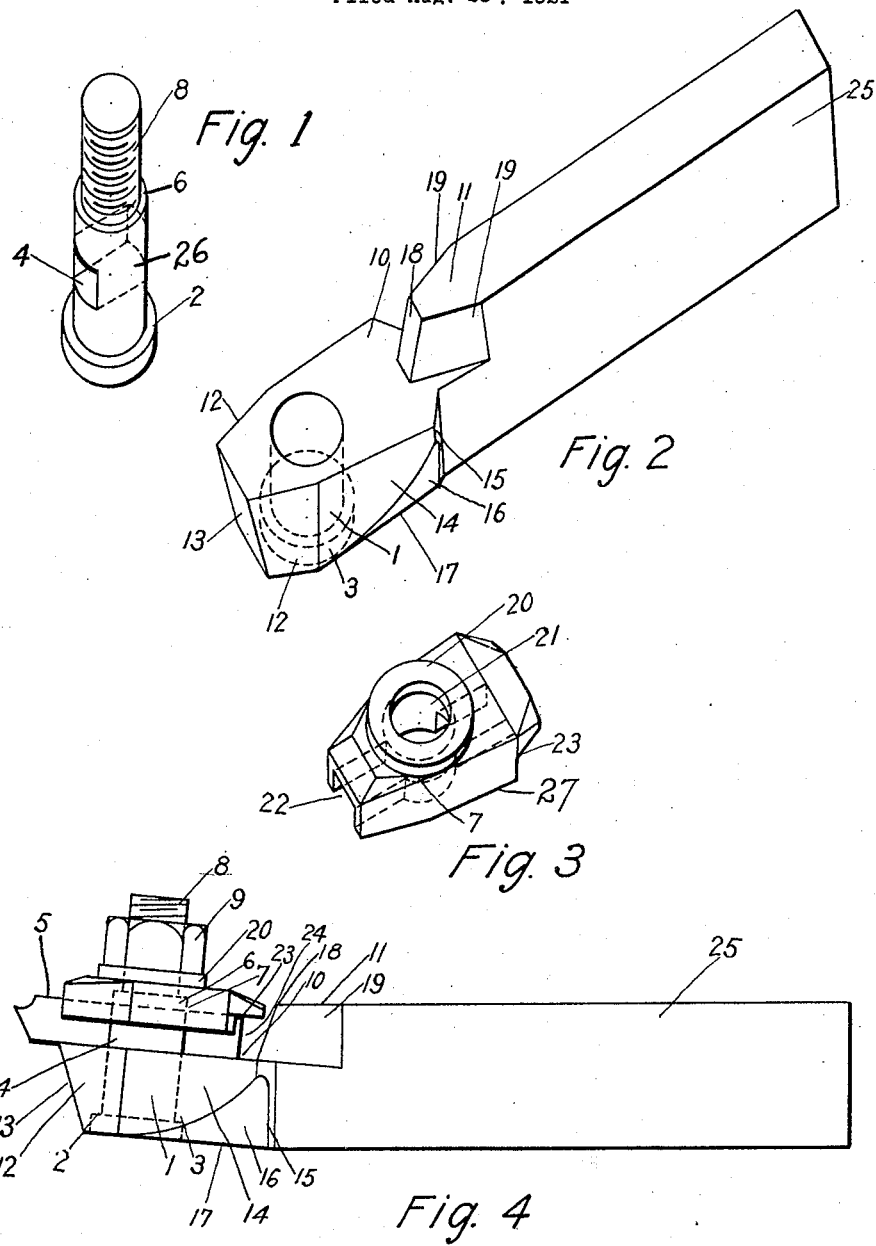
Inventor
Wᴹ F. MARSHALL
By his Attorney Patented Dec. 4, 1923.

1,476,262

UNITED STATES PATENT OFFICE.

WILLIAM F. MARSHALL, OF NEW YORK, N. Y.

MOVABLE TOOL HOLDER FOR LATHES.

Application filed August 22, 1921. Serial No. 494,454.

*To all whom it may concern:*

Be it known that I, WILLIAM F. MARSHALL, a citizen of the United States, residing at No. 746 St. Nicholas Avenue, in the borough of Manhattan, in the county of New York and State of New York, have invented a new and useful Movable Tool Holder for Lathes, of which the following is a specification.

My invention relates to improvements in tool holders for lathes and the objects of my improvement are, to provide a tool holder which is readily adjustable so that the tool may be held against the work in the lathe at any position. The tool holder is simple in construction and efficient in operation. The tool may be quickly changed or moved in any desired degree and long or short tools may be used at will.

Other objects and advantages of my improved tool holder will be brought out in the following specification and illustrated in the drawings of which, Fig. 1, is a perspective view of the stud or pivot member.

Fig. 2 is a perspective view of the shank and tongue or head.

Fig. 3 is a perspective view of the clamping member.

Fig. 4 is a side elevation of the tool holder, assembled.

Referring again to the drawings, the reference numeral 25 indicates the shank or handle of the tool holder, having its one end flattened out to form the tongue or head 10. As seen particularly in Fig. 2, the working face of the tongue is flat. Beveled surfaces 18, 19, 19, are provided at approximately right angles to the working face of the tongue. These surfaces are in that portion of the shank designated 11, and their purpose will be more fully described hereinafter. The tongue may have other beveled surfaces as shown at 12, 13, 14, 15, 16 and 17, for purposes of strength and to permit of free access to the work in the lathe. It will be noted that the tongue 10, is offset in its relation to the shank 25.

The tongue is provided with a counterbored hole 1, to accommodate a pivot or stud 26. The stud 26 has the head 2, and slot 4.

The head 2 fits in the counterbored part 3 of the hole 1. The bottom of the slot 4 thru which the tool 5 is adapted to pass is slightly below the plain working face of the tongue 10 when the holder is assembled. A shoulder 6, is provided on the stud 26 at its intermediate position and beyond this shoulder, the stud is threaded at 8 to accommodate a nut 9.

The nut 9 forces the clamping member on the tool 5 and holds said tool in any desired position. The clamping member 27 has a longitudinal slot 22 which, when the device is assembled, is aligned with the slot 4 in the stud and the tool 5 is made to conform with the said slots 4, 22. A base 20, is formed around the opening 21 in the clamping members 27 to provide a bearing for the nut 9. The clamping member has a cut away part 23, which when the device is assembled provides a space 24 in which a bar may be placed to assist in clamping a short length tool and prevent the clamping member from canting.

When the tool is in position in the holder as shown in Fig. 3, we may have a short length tool or the tool may be long enough to butt up against the surface 18. It is clear that the tool may be readily placed in any position by loosening the nut 9 and turning the pivot stud 26. When a long tool is used in either a right or left hand position, the end of the tool may rest against either of the surfaces 19, and thus prevent any tendency to turn.

Having described my invention, what I claim as new and desire to secure by Letters Patent is:—

An adjustable tool for lathes having a shank and a tongue or head, the end of said shank forming an abutment for a cutting tool, said abutment having two angularly disposed faces adapted to reinforce the cutting tool for either right or left hand cutting and a connecting face disposed at approximately right angles to the axis of said shank, said tool holder being provided with means to clamp the tool in any of its cutting positions.

WILLIAM F. MARSHALL.